Patented Dec. 8, 1931

1,835,409

UNITED STATES PATENT OFFICE

JULIUS LAUX, OF UERDINGEN-ON-THE-RHINE, GERMANY, ASSIGNOR TO I. G. FARBEN-INDUSTRIE AKTIENGESELLSCHAFT, OF FRANKFORT-ON-THE-MAIN, GERMANY, A CORPORATION OF GERMANY

PRODUCTION OF IRON OXIDE PIGMENTS

No Drawing. Application filed February 4, 1928, Serial No. 252,040, and in Germany February 15, 1927.

The present invention relates to processes for the production of iron oxide pigments; more specifically it relates to a process in which finely divided iron hydroxides are obtained as by-products from the reduction of aromatic nitro compounds by means of iron and acids or acid reacting salts. The invention also embraces the new products.

In the methods of producing aromatic amines heretofore known and used for a long time involving the use of iron and an amount of acid insufficient to dissolve the same, the iron which is used as the reducing agent generally changes into a brown-black oxide whose composition corresponds to a formula which lies between $Fe_3O_4$ and $Fe_2O_3$. This oxide is not useful as a color pigment and is of very inferior quality on account of its low coloring power.

As I have set forth in my co-pending applications for U. S. Letters Patent Serial No. 134,123, filed on September 7, 1926, and Serial Nos. 218,353 and 218,354 filed on September 8, 1927, finely divided iron oxides or iron hydroxides of high commercial value are obtained by carrying out the reduction in the presence of an aqueous solution of an aluminium salt.

I have found further that this process of obtaining iron oxide pigments as by-products from the reduction of aromatic nitro compounds to the corresponding amines is not restricted to the use of aluminium salts but that salts of the rare earth metals likewise give excellent results.

According to the present invention the reduction of aromatic nitro compounds with iron metal is carried out in the presence of a dilute aqueous solution of a salt of a rare earth metal such as the soluble halogenides, sulfates and acetates of cerium, didymium, samarium, europium, gadolinium, terbium, dysprosium, holmium, erbium, thulium, yttrium, ytterbium, scandium, lutetium, thorium chloride, thorium bromide, thorium acetate, complex thorium double sulfates and their mixtures.

A ready made solution of such a salt may be employed, to which a further addition of acid may be unnecessary if the well known hydrolysis of the salts of the above-mentioned metals leads to the production of sufficient acid for the reduction. The chlorides of the rare earth metals have been found to be particularly suitable for carrying out the invention.

If the reduction is carried out in this manner in the presence of a dilute solution of a salt of a rare earth metal with or without further addition of an acid (the process not essentially departing in other respects from the customary processes, as will be evidenced by the examples hereinafter set forth) there remains after the separation of the aromatic amine, for example, aniline, resulting from the nitro compound, a slurry which contains the oxidized iron as a finely divided yellowish brown to violet hydroxide of the trivalent iron oxide $Fe_2O_3$. After levigating, washing out and drying, this hydroxide is useful as a color pigment either directly or, if red shades are desired, after being subjected to a preliminary calcination.

The process is illustrated by the following examples. It is to be understood, however, that the process according to the present invention is capable of being carried out with other nitro compounds than those mentioned in the examples, for example with hydroxy- and aminonitro compounds, polynitro compounds, and nitro-sulfonic acids. Other acids than hydrochloric acid may be combined with the rare earth metals used and in addition to the salts of the rare earth metals, the reaction mixture may contain other soluble salts such as halogenides or sulfates of the alkaline or alkaline earth metals in low concentration.

1. 200 kgs. of nitrobenzene are allowed to run at 100° C. into a vigorously agitated mixture of a solution of 40 kgs. of cerium chloride in 300 litres of water and 200 kgs. of ground iron. The temperature maintains itself at 100° C. due to the heat of reaction. When the reduction is finished the resulting aniline is separated in the well known manner. There remains a brilliant brown slurry, which is separated from the excess of metallic iron and dried. It consists of an iron hydroxide having an average content of 11,3 percent of chemically combined water. By calcination it is converted into a deep violet red iron oxide pigment.

2. 200 kgs. of nitrobenzene are reduced by means of a solution of 5 kgs. of cerium chloride in 250 kgs. of water and 200 kgs. of ground iron as set forth in Example 1. The resulting slurry has a violet color and consists of an iron hydroxide having an average content of 9 percent of chemically combined water.

3. 200 kgs. of ground iron are gradually admitted to a mixture of 200 kgs. of ortho-nitrotoluene and a solution of 20 kgs. of lanthanium chloride in 250 litres of water. When the reduction is complete, the formed ortho-toluidine is separated in a well known manner. The remaining slurry consists of a bluish red iron hydroxide having an average content of 11,4 percent of chemically combined water.

4. 200 kgs. of para-nitrochlorobenzene are reduced by means of a solution of 5 kgs. of didymium chloride in 200 litres of water and 200 kgs. of iron. The produced iron hydroxide has a dark brown red color and generally contains 9,6 percent of chemically combined water.

5. 200 kgs. of nitronaphtalene are reduced in a solution of 20 kgs. of cerium chloride in 400 litres of water and 10 kgs. of hydrochloric acid (sp. gr. 1,16) by gradually adding 200 kgs. of iron. After complete reduction the naphtylamine produced is extracted by means of solvents. The brown red residue yields a brilliant red iron oxide by calcination.

6. 200 kgs. of nitrobenzene are reduced by means of a solution of 20 kgs. of cerium sulfate in 250 litres of water while gradually adding 200 kgs. of ground iron. The resulting residue yields a brilliant red iron oxide by calcination.

7. 200 kgs. of nitrobenzene are reduced by means of a solution of 20 kgs. of cerium chloride in 300 litres of water and 10 kgs. of concentrated sulfuric acid (sp. gr. 1,84). The resulting iron hydroxide is of a brown red color and is converted into a brilliant red iron oxide by calcination.

I claim:

1. In the process of reducing an aromatic nitro compound involving the treatment of the nitro compound with iron and an agent which hydrolizes to produce hydrogen ions, to the production of the corresponding amine and an iron oxide sludge, the steps of improving the pigmenting properties of said iron oxide sludge which consists in using as the said agent an acid-reacting dilute aqueous solution of a salt of a rare earth metal insufficient in amount to dissolve the iron, separating the iron oxide sludge from the resulting amino compound and purifying the former by levigation and washing out.

2. In the process of reducing an aromatic nitro compound involving the treatment of the nitro compound with iron and an agent which hydrolizes to produce hydrogen ions, to the production of the corresponding amine and an iron oxide sludge, the steps of improving the pigmenting properties of said iron oxide sludge which consists in using as the said agent an acid-reacting dilute aqueous solution of a salt of a rare earth metal insufficient to amount to dissolve the iron, separating the iron oxide sludge from the resulting amino compound, purifying the former by levigation and washing out and drying and calcining the resulting product.

3. In the process of reducing an aromatic nitro compound involving the treatment of the nitro compound with iron and an agent which hydrolizes to produce hydrogen ions, to the production of the corresponding amine and an iron oxide sludge, the steps of improving the pigmenting properties of said iron oxide sludge which consist in using as the said agent an acid-reacting dilute aqueous solution of a chloride of a rare earth metal, separating the iron oxide sludge from the resulting amino compound and purifying the former by levigation and washing out.

4. In the process of reducing an aromatic nitro compound involving the treatment of the nitro compound with iron and an agent which hydrolizes to produce hydrogen ions, to the production of the corresponding amine and an iron oxide sludge, the steps of improving the pigmenting properties of said iron oxide sludge which consist in using as the said agent a mixture of an acid and a dilute aqueous solution of a salt of a rare earth metal, separating the iron oxide sludge from the resulting amino compound and purifying the former by levigation and washing out.

5. In the process of reducing an aromatic nitro compound involving the treatment of the nitro compound with iron and an agent which hydrolizes to produce hydrogen ions, to the production of the corresponding amine and an iron oxide sludge the steps of improving the pigmenting properties of said iron oxide sludge which consist in using as the said agent a mixture of hydrochloric acid and a dilute aqueous solution of a salt of a rare earth metal, separating the iron oxide sludge from the resulting amino compound and purifying the former by levigation and washing out.

6. In the process of reducing an aromatic nitro compound involving the treatment of the nitro compound with iron and an agent which hydrolizes to produce hydrogen ions, to the production of the corresponding amine and an iron oxide sludge, the steps of improving the pigmenting properties of said iron oxide sludge which consist in using as the said agent a mixture of hydrochloric acid and a dilute aqueous solution of a chloride of a rare earth metal, separating the iron oxide sludge from the resulting amino compound and purifying the former by levigation and washing out.

In testimony whereof I have hereunto set my hand.

JULIUS LAUX.